(No Model.)

J. H. SHARP.
SAND BAND FOR VEHICLE AXLES.

No. 380,528. Patented Apr. 3, 1888.

Witnesses,
H. S. Rohrer,
Joseph H. Hunter.

Inventor.
John H. Sharp.
By his Attorney

UNITED STATES PATENT OFFICE.

JOHN H. SHARP, OF COLUMBUS, NEW JERSEY.

SAND-BAND FOR VEHICLE-AXLES.

SPECIFICATION forming part of Letters Patent No. 380,528, dated April 3, 1888.

Application filed November 23, 1887. Serial No. 255,967. (No model.)

*To all whom it may concern:*

Be it known that I, JOHN H. SHARP, a citizen of the United States, residing at Columbus, in the county of Burlington and State of New Jersey, have invented certain new and useful Improvements in Sand-Bands for Journals; and I do hereby declare the following to be a full, clear, and exact description of the invention, such as will enable others skilled in the art to which it appertains to make and use the same.

My invention has for its object to provide an improved, novel, and simplified device for excluding dust and other foreign substances from vehicle or machine journals; and to this end my improvements consist, essentially, of an outwardly-tapering flange or circular projection attached to the box or bearing and adapted to receive the journal, which is provided with a large and small collar located at a suitable distance apart and of a suitable diameter to fit within the said tapering projection upon the box or bearing, as will be hereinafter fully described, and specifically designated in the claim.

Figure 1:
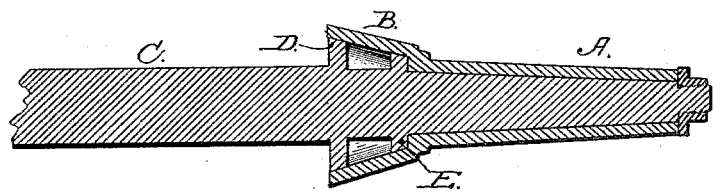
Figure 2:
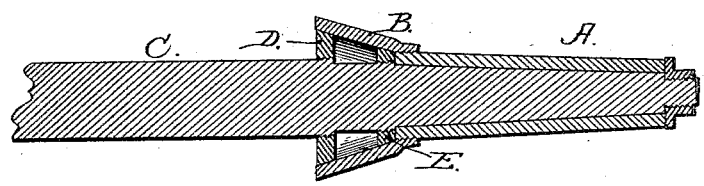
Figure 3:
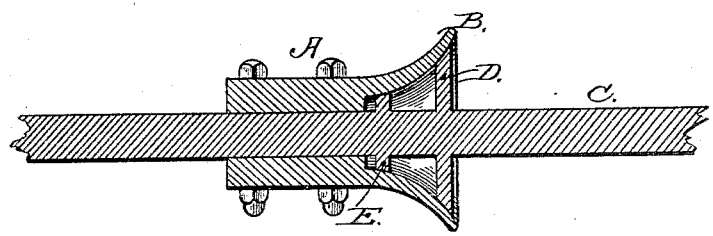

In the accompanying drawings, Figure 1 represents a longitudinal section of my invention as applied to a vehicle-axle; Fig. 2, a similar view of a modification thereof, and Fig. 3 a like view as applied to a machine-journal and its bearings.

Similar letters of reference indicate like parts in the several figures of the drawings.

In carrying out my invention the inner end of the box A of the vehicle-wheel is provided with a circular and tapering flange, B, of an increased diameter to that of the said box, and which may be either formed integral therewith or adapted to be screwed or otherwise suitably secured thereon, as shown. The journal or axle C is also provided with two collars, D and E, having beveled edges, and which are located a short distance apart, the inner one, E, of which is of such a size as to snugly fit within the smaller end of the tapering flange B, while the outer collar, D, is of an increased size and adapted to fit within the enlarged and tapering mouth of the said flange B, as shown. These collars D and E may be formed integral with the journal or axle, or otherwise suitably affixed thereon, as may be found most desirable or advantageous.

In the operation of the device the least dust or other foreign substance which may find its way into the top of the tapering flange is drawn down the tapering sides of the said flange and discharged therefrom, rendering it impossible for the dust to penetrate into the bearings of the axle or journal, the principle of the invention being that the natural tendency of the dust would be to seek the lowest outlet, which result is aided by the rotary movement of the box or bearing, the inner collar upon the journal tending to convey the dust down the tapering sides of the flange.

While my improved device is more especially desiged for vehicle-wheels of all descriptions, it is equally adapted for use in machine-journals, in which case the stationary box or bearing is provided with an enlarged and outwardly-tapering mouth, B, adapted to receive the journal C, having a collar, D, secured thereon, and of a size to fit the greatest diameter of said tapering mouth B, as shown.

The advantages of my invention will be readily apparent, inasmuch as it combines simplicity and economy in its construction with an efficiency and reliability in its operation.

Having thus described my invention, I claim as new and desire to secure by Letters Patent—

A sand-band for journals, consisting of a box or bearing provided with an outwardly-tapering flange or mouth, and a journal provided with collars D and E, having beveled edges which are adapted to fit the tapering mouth of the box or bearing, substantially as and for the purpose specified.

In testimony whereof I affix my signature in presence of two witnesses.

JOHN H. SHARP. [L. S,]

Witnesses:
    PARKER H. SWEET, Jr.,
    ROBINSON WHITE.